United States Patent [19]

Sera et al.

[11] Patent Number: 4,725,572
[45] Date of Patent: Feb. 16, 1988

[54] PROCESS FOR PREPARING A CATALYST FOR REMOVING NITROGEN OXIDES

[75] Inventors: Toshikuni Sera; Shigeaki Mitsuoka; Touru Seto; Kozo Iida; Hiroshi Suzumura; Yoshiaki Obayashi, all of Hiroshima, Japan

[73] Assignee: Mitsubishi Jukogyo Kabushiki Kaisha, Tokyo, Japan

[21] Appl. No.: 898,135

[22] Filed: Aug. 19, 1986

[30] Foreign Application Priority Data

| Aug. 19, 1985 | [JP] | Japan | 60-180438 |
| Aug. 19, 1985 | [JP] | Japan | 60-180439 |
| Aug. 19, 1985 | [JP] | Japan | 60-180440 |
| Sep. 20, 1985 | [JP] | Japan | 60-206561 |

[51] Int. Cl.$^4$ .......................... B01J 21/06; B01J 23/24
[52] U.S. Cl. ..................................... 502/236; 502/240; 502/241; 502/242; 502/244; 502/247; 502/254; 502/309; 502/350
[58] Field of Search ............... 502/236, 242, 309, 350, 502/254, 240, 241, 244, 247

[56] References Cited

U.S. PATENT DOCUMENTS

| 2,873,246 | 2/1959 | Hansford et al. | 502/236 |
| 4,113,660 | 9/1978 | Abe et al. | 502/350 |

FOREIGN PATENT DOCUMENTS

| 1443717 | 5/1969 | Fed. Rep. of Germany | 502/309 |
| 2846476 | 5/1979 | Fed. Rep. of Germany | 502/309 |
| 24338 | 2/1983 | Japan | 502/236 |
| 193733 | 11/1983 | Japan | 502/309 |
| 35026 | 2/1984 | Japan | 502/309 |

Primary Examiner—Carl F. Dees
Attorney, Agent, or Firm—Toren, McGeady & Associates

[57] ABSTRACT

A process for preparing a catalyst for removing nitrogen oxides which comprises sintering orthotitanic acid in coexistence of at least one compound, selected from silicic acid in the form of fine particles, tungsten compounds and molybdenum compounds.

16 Claims, 5 Drawing Figures

PROCESS FOR PREPARING A CATALYST FOR REMOVING NITROGEN OXIDES

BACKGROUND OF THE INVENTION

1. Field of the Invention

This invention relates to a process for preparing a catalyst for removing nitrogen oxides and more particularly, to a process for preparing a catalyst which does not oxidize sulfur dioxide on removal of nitrogen oxides.

2. Description of the Related Art

It has been already known that a titanium oxide sintered product is used as a carrier or catalyst. Since the surface area, crystal form, mechanical strehgth and heat resistance, which give an important influence on the performance of the carrier or catalyst, vary depending on the manner of preparation, the absence or presence, type and amount of additive, various processes have been heretofore provided.

For instance, it is known that metatitanic acid or orthotitanic acid, which are readily obtained by thermal hydrolysis of titanates, are converted by sintering into anatase-type titanium oxide. This type of titanium oxide is generally, though not essentially, considered to be a favorable crystal form for use as a carrier or catalyst and has been used as a starting material for a carrier on which a conventional catalyst for removing nitrogen oxides is to be supported.

In a method in which silica is added to the thus obtained titanium hydroxide or titanium oxide and sintered, however, it is difficult to obtain a mixture of a uniform composition. Especially, where silica is added to titanium hydroxide which is in the form of a gel, it is not possible to uniformly disperse silica to titanium hydroxide. Thus, there cannot be obtain a carrier or catalyst of a high performance.

According to a method in which an additive, such as silica, is added to orthotitanic acid, a mixture of a uniform composition is also difficult to obtain. Since orthotitanic acid is generally in the form of a gel, it is difficult to uniformly disperse an additive to orthotitanic acid, so that there cannot be obtain a carrier or catalyst of a high performance.

SUMMARY OF THE INVENTION

It is an object of the invention to provide a process for preparing a catalyst or carrier useful for removing nitrogen oxides which overcomes the above-mentioned drawbacks, which has a better performance than those obtained by prior art methods.

Broadly, the present invention provides a process for preparing a catalyst for removing nitrogen oxides which comprises sintering orthotitanic acid in coexistence of at least one compound selected from the group consisting of silicic acid in the form of fine particles, tungsten compound and molybdenum compounds. Therefor, the present invention provides a process for preparing a catalyst for removing nitrogen oxides which comprises that active components for removal of nitrogen oxides may be further supported on the said sintered product.

DETAILED DESCRIPTION AND EMBODIMENTS OF THE INVENTION

Figure 1:
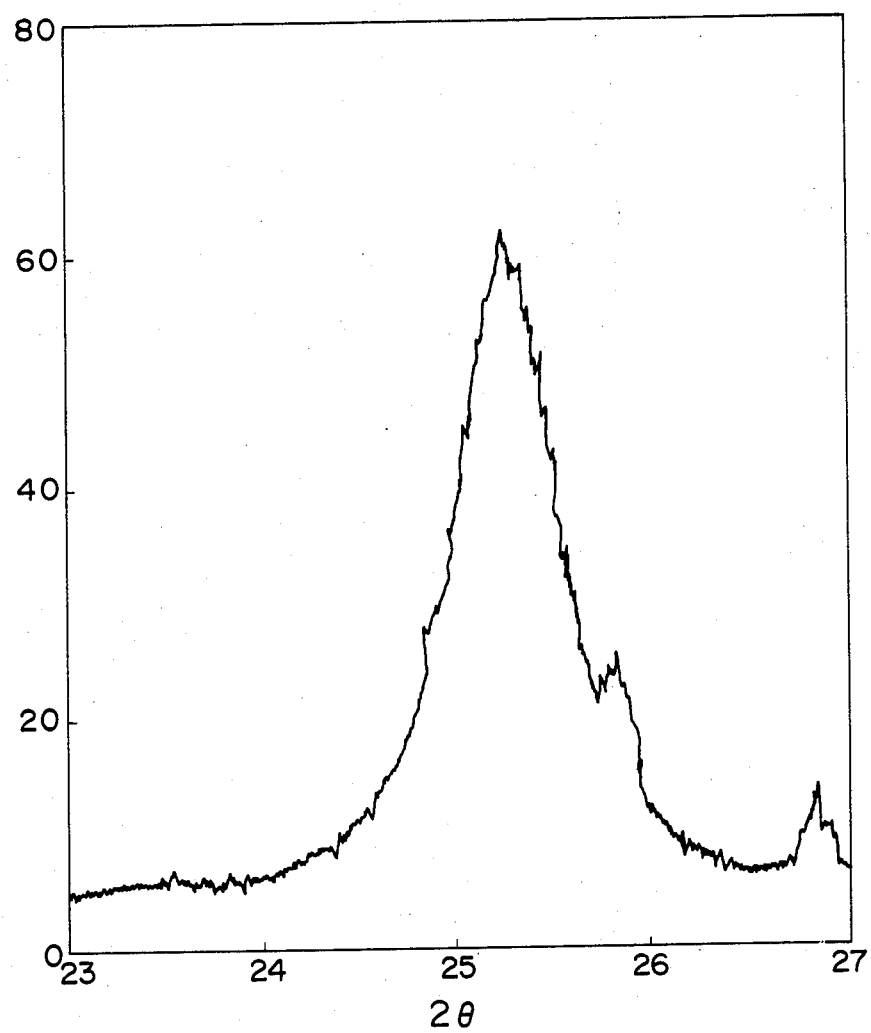
FIG. 1 is an X-ray spectrum of a sintered titanium product obtained in Example 5.

According to one embodiment of the invention, there is provide a process for preparing a carrier for a catalyst which is adapted for removal of nitrogen oxides, the process comprising adding fine particles of silicic acid to titanium sulfate, subjecting the mixture to neutralization and hydrolysis to form orthotitanic acid, drying the resulting mixture, and sintering the dried mixture to obtain a sintered product and a process for preparing a catalyst for removal of nitrogen oxides comprising that catalytic components for removal of nitrogen oxides are deposited on the said sintered product.

In the above process characterized by adding fine particles of silicic acid to titanium sulfate subjecting the mixture to neutralization and hydrolysis, drying and then sintering, it is preferred that the orthotitanic acid obtained by neutralization and hydrolysis of titanium sulfate in the presence of fine particles of silicic acid is converted into a sol, filtered and dried and then sintered.

According to another embodiment of the invention, a catalyst for removal of nitrogen oxides can be obtained by sintering orthotitanic acid in the form of a sol which contains a tungsten compound and/or a molybdenum compound used as an additive. The process according to this embodiment is characterized by sintering a sol of orthotitanic acid which contains at least one compound selected from tungsten compounds and molybdenum compounds, and is characterized that catalytic components for nitrogen oxides may be supported or deposited on the resulting sintered product to obtain a catalyst for removal of nitrogen oxides.

According to a further embodiment of the invention, orthotitanic acid is sintered in the presence of both fine particles of silicic acid and a tungsten compound and/or a molybdenum compound, by which crystal growth of titanium oxide is suppressed at the time of sintering of orthotitanic acid so that crystals of titanium oxide are left ungrown as anatase. The resulting sintered product has thus a large surface area and improved mechanical strength and heat resistance. This sintered product may be as it is or by depositing a certain type of metal oxide on the product as a carrier. If a metal oxide is supported on the sintered product, there is obtained a catalyst for nitrogen oxides which is significantly improved, as have never been achieved in prior art, by the synergistic effect of the oxides in the carrier and the metal oxide used.

The process according to this embodiment of the invention comprises sintering orthotitanic acid in the form of a sol which contains (a) fine particles of silicic acid and (b) at least one compound selected from tungsten compounds and molybdenum compounds, or comprising that catalytic components for nitrogen oxides may be deposited or supported on the resulting sintered product.

The fine particles of silicic acid used in the present invention are sometimes called white carbon and is characterized by its very large specific surface area. These fine particles of silicic acid may be prepared either by a wet process or a dry process. In the practice of the invention, ordinary commercially available products may be used. The commercial products of finely divided silicic acid suitable for the purpose of the invention are available, for example, under the trade name of Fine Seal (Tokuyama Soda Co., Ltd.), Hisil, Valcasil and Carplex (Shionogi Pharm. Co., Ltd.), Nipsil and Toku Sil (Tokuyama Soda Co., Ltd.), Vitasil, Siloid and Aerosil (Nippon Aerosil Co., Ltd.), and the like. Of these, those products having an average particle size of from 10 to 50 millimicrometers and a specific surface area of from 200 to 300 m$^2$/g are preferred. The amount of the finely divided silicic acid is from 5 to 50 wt % based on titanium oxide. When the amount is less than 5 wt %, the performance as a carrier by addition of finely divided silicic acid to a sintered product is improved only in a slight degree. On the other hand, over 50 wt %, a relative content of titanium oxide becomes small. When such a product having a small content of titanium oxide is used as a carrier, the properties as the carrier unfavorably lower.

The tungsten compounds used in the present invention are tungsten oxide or precursors capable of conversion into tungsten oxide by sintering. Examples of the precursors include ammonium paratungstate. Likewise, the molybdenum compounds include molybdenum oxide or precursors capable of conversion into molybdenum oxide by sintering. Examples of the precursors include ammonium molybdenate. Taking into consideration uniform mixing with anatase-type titanium oxide, these compounds should preferably be in the form of a solution.

The amounts of the tungsten and molybdenum compounds are, respectively, from 5 to 50 wt %, calculated as $WO_3$ and $MoO_3$, on the basis of titanium oxide. Amounts less than 5 wt % result in a poor effect of suppressing the crystal growth at the time of sintering of orthotitanic acid. Over 50 wt %, a further effect of the addition is not recognized, thus being unfavorable from the standpoint of economy.

In the third embodiment of the invention, when finely divided silicic acid and a tungsten compound and/or a molybdenum compound are mixed simultaneously, it is preferred that the mixing ratio by weight of the finely divided silicic acid and the tungsten compound and/or molybdenum compound is in the range of 1:2 to 5. This ratio corresponding to a content of silicic acid of 1 to 25 wt % based on titanium oxide, within which the resulting carrier is improved in quality. Amounts less than 1 wt % result in a less effect of the addition of silicic acid. On the contrary, amounts exceeding 25 wt % are unfavorable because strength lowers and the activity is impeded.

In the practice of the invention, it is preferred that orthotitanic acid is converted to a sol, to which at least one compound selected from tungsten compounds and molybdenum compounds, followed by mixing and sintering. Alternatively, finely divided silicic acid and at least one compound selected from tungsten and molybdenum compounds are added to orthotitanic acid, followed by converting the orthotitanic acid to a sol and mixing. In either case, it is necessary that finely divided silicic acid and the at least one compound be present in orthotitanic acid which has been partially or wholly converted to a sol. This permits the additives to be uniformly mixed with orthotitanic acid.

In accordance with the method of the invention, finely divided silicic acid and at least one compound are added to an aqueous solution of titanium sulfate and the mixture is neutralized for hydrolysis to produce orthotitanic acid, followed by co-precipitating the orthotitanic acid along with the finely divided silicic acid and the at least one compound. The substances used for the neutralization and hydrolysis may be any basic substances, of which aqueous ammonia is preferred because of the ease in washing with water after the reaction.

It is known that the neutralization and hydrolysis of titanium sulfate results in formation of orthotitanic acid. This orthotitanic acid is in the form of a gel. Preferably, after the neutralization and hydrolysis of titanium sulfate in the presence of the finely divided silicic acid and the at least one compound, the resulting gel of orthotitanic acid is partially or wholly solated. This allows the finely divided silicic acid and the at least one compound to be more uniformly dispersed in the orthotitanic acid sol.

The manner of solation is not critically limited. For instance, the reaction mixture obtained by the neutralization and hydrolysis is washed with water to remove a substantial amount of the sulfate radicals, to which hydrochloric acid or nitric acid is added to solate part or substantially all of the reaction mixture. In cases where the sulfate radical are not removed by washing with water, there are added to the reaction mixture chlorides of alkaline earth metals such as barium chloride, strontium chloride, calcium chloride and the like or nitrates of alkaline earth metals such as barium nitrate, strontium nitrate, calcium nitrate and the like. While the sulfate radicals are fixed as water-insoluble alkaline earth metal salts, the reaction mixture is partially or wholly solated. The amount of these solating agents is appropriately determined depending on the degree of solation of the reaction mixture. It will be noted that because the orthotitanic sol is subsequently gelled at a pH of 1 to 2 or higher, the sol may be gelled, if necessary, after uniform and sufficient mixing with at least one compound selected from finely divided silicic acid, tungsten compounds and molybdenum compounds.

The thus obtained mixture of orthotitanic acid and at least one compound selected from finely divided silicic acid, tungsten compounds and molybdenum compounds is washed with water, filtered, dried and then sintered at a temperature not higher than 800° C., preferably from 700° to 200° C., followed by milling to obtain a sintered powder product. Since orthotitanic acid obtained by neutralization and hydrolysis of titanium sulfate is used, a slight amount of sulfate radicals is contained. This is considered to be one of factors for the formation of anatase-type titanium oxide which is preferred as a carrier for nitrogen oxide-removing catalysts.

When the powder product is shaped into a desired form such as a honeycomb for use as a carrier, the dry product obtained by drying the said mixture before sinterning may be shaped by any known techniques such as, for example, an extrusion molding, a rolling granulation and the like, and subsequently sintered. Alternatively, the sintered powder product may be mixed with a suitable amount of water, kneaded and shaped into a desired form, followed by sintering again. In this case, after shaping into the desired form, the shaped articles is sintered at a temperature not higher than 800° C., preferably from 700° to 200° C. Thus, a titanium oxide sintered product in the form of powders or moldings can be obtain according to the invention.

According to a fourth embodiment of the invention, a sintered product, which is obtained by neutralizing and hydrolyzing purified titanium sulfate (TiOSO$_4$) with a basic substance such as ammonia, washing the resulting mixture with water and sintering orthotitanic acid (Ti(OH)$_4$), is mixed with a tungsten compound and/or a molybdenum compound, dried and then sintered. The resulting product has a larger surface area and good strength and heat resistance and is thus very suitable for use as a catalyst for removal of nitrogen oxides or a carrier for various catalysts.

Accordingly, a method for preparing a catalyst for removal of nitrogen oxide according to the fourth embodiment of the invention is characterized by a process comprising mixing a sintered product obtained by neutralization and hydrolysis of titanium sulfate with a tungsten compound and/or a molybdenum compound, and drying and sintering the mixture, and further characterized by a process that catalytic components for removal of nitrogen oxides may be supported on the final sintered product to obtain a catalyst for nitrogen oxides.

The basic substances used for the neutralization and hydrolysis of the titanium sulfate may be any compounds which are basic. In view of the ease of removal by washing with water after the reaction, aqueous ammonia is preferred. The precipitate of the resulting orthotitanic acid is washed with water, filtered, dried, and sintered at a temperature not higher than 800° C., preferably from 700° to 300° C., and milled to obtain a sintered product in the form of powder. In this case, orthotitanic acid which is obtained from titanium sulfate is used, so that sulfate radicals are contained in slight amounts, resulting in formation of anatase which is preferred as a carrier or catalyst.

Similar to the foregoing embodiments, a suitable amount of water is added to a mixture of the anatase and a tungsten compound and/or a molybdenum compound, kneaded and shaped into a desired form by any known techniques mentioned before, and sintered. If the tungsten compound and/or molybdenum compound is used in the form of a solution, water may not necessarily be required. The sintering temperature is in the range not higher than 800° C., preferably from 700° to 300° C. Thus, a sintered product of titanium oxide, tungsten oxide and/or molybdenum oxide can be obtained in the form of a powder or a molding.

In the method according to any of the first to fourth embodiments of the invention, when a powder of the dry or sintered product is mixed with an orthotitanic acid sol or gel, shaped into a desired form and sintered, various physical properties such as mechanical strength, porosity, specific surface area, pore distribution and the like can be further improved. In addition, the rate of shrinkage at the time of sintering can be suppressed. For this purpose, the adding amount of the orthotitanic acid sol or gel is conveniently in the range of from 5 to 50 wt % of the final article on calculation as titanium oxide.

Of course, on molding, ordinary moldings aids may be used including methyl cellulose (Abicell, commercial name of Asahi Kasei Co., Ltd.).

The sintering atmosphere is not critical and air, combustion gases, inert gases are all usable in the practice of the invention.

The sintered product obtained by the invention is made of ungrown anatase, which is confirmed through X-ray spectra of FIGS. 1 to 4 having low and broad peaks. With anatase-type titanium oxide for pigments, the crystals grow to a substantial extent, as will be seen from the X-ray spectrum of FIG. 4, with a high and sharp peak.

The sintered product of titanium oxide according to the invention may be used as a catalyst for removing nitrogen oxides as it is or as a carrier.

When used as a carrier, the sintered product is supported with oxides which are known to have catalytic activity against nitrogen oxides, by which there can be obtained a catalyst which shows a good selective catalytic reduction performance for nitrogen oxides, using ammonia as a reducing agent, owinq to unexpected synergistic effects with the oxides of the sintered product.

The catalytic component to be supported in the present invention may be an oxide of at least one element selected from vanadium, tungsten, molybdenum, copper, iron, chromium, manganese and cerium. The oxide may be deposited on the titanium oxide sintered product by any known methods of preparing a catalyst. For instance, a solution or dispersion of the oxide or a precursor thereof is impregnated in or coated on the sintered product of a desired form and, if necessary, sintered at a predetermined temperature. The sintered product in the form of a powder may be mixed with the solution or dispersion, kneaded, shaped into a desired form and, if necessary, sintered at a predetermined temperature to obtain a catalyst for removal of nitrogen oxides.

In order to remove nitrogen oxides from a mixed gas containing the nitrogen oxides by the use of a catalyst obtained by the invention, ammonia is added to the mixed gas in an amount of 0.5 to 5 times by mole, preferably from 1 to 2 times by mole, the nitrogen oxides to be removed and is passed through a reaction bed charged with the catalyst. The reaction bed may be a moving bed, a fluidized bed or a fixed bed.

The catalyst obtained according to the invention contains at least one compound selected from finely divided silicic acid, a tungsten compound and a molybdenum compound and has so a good heat resistance that the reaction temperature may be in a wide range of from 200° to 600° C., preferably from 300° to 500° C. The space velocity is in range of from 1,000 to 100,000 hr$^{-1}$, preferably from 3,000 to 30,000 hr$^{-1}$.

Although the catalyst may be used to treat any gases containing nitrogen oxides, it can be used conveniently to remove nitrogen oxides from an exhaust gas from a boiler which contains 100 to 1000 ppm of nitrogen oxides chiefly composed of nitrogen monoxide, 200 to 2000 ppm of sulfur oxides mainly composed of sulfur dioxide, 1 to 10% by volume of oxygen, 5 to 20% by volume of carbon dioxide and 5 to 20% by volume of steam.

According to the method of the invention, at least one compound selected from tungsten compounds, molybdenum compounds and finely divided silicic acid is allowed to be present in solated orthotitanic acid. In the mixture, the at least one compound is uniformly mixed. When the mixture is sintered, titanium oxide is left as ungrown anatase crystals by the action of the at least one compound. The resulting sintered product has a large surface area and significantly improved mechanical strength and heat resistance. When the sintered product is used as a catalyst for removal of nitrogen oxides with or without deposition of metal oxides having catalytic activity not only the catalytic activity of removing nitrogen oxides can be held over a long time under severe use conditions, but also the rate of oxidation of sulfur dioxide into sulfur trioxide is very low. This is considered to result from the synergistic effect of the anatase-type titanium oxide whose crystal development is suppressed and the at least one compound. Thus, the titanium oxide obtained by the invention is very useful for industrially removing nitrogen oxides.

The present invention is more particularly described by way of examples, which should not be construed as limiting the invention.

EXAMPLE 1

One kilogram, as titanium oxide, of a titanium sulfate solution was taken out from a process of preparing titanium oxide by a sulfate method, to which 200 g of finely divided silicic acid (Fine Seal from Tokuyama Soda Co., Ltd.). The mixture was sufficiently agitated and mixed, followed by addition of aqueous ammonia to neutralize and hydrolyze the titanium sulfate, permitting co-precipitation with the finely divided silicic acid. The precipitate was filtered, washed with water, dried at 100° C. for 12 hours and sintered at a temperature of 500° C. for 3 hours. The sintered product was milled in a sample mill and the resulting particles were suitably adjusted in size.

Water was added to the particles and the mixture was kneaded, followed by extrusion molding in the form of a lattice by means of an extruder, heating from normal temperatures to 100° C. for drying, and sintering at 500° C. for 3 hours to obtain a carrier used for removal of nitrogen oxides.

EXAMPLE 2

One kilogram, as titanium oxide, of a titanium sulfate solution was taken out from a manufacture process of titanium oxide by a sulfate method, to which 200 g of finely divided silicic acid (Fine Seal from Tokuyama Soda Co., Ltd.), followed by sufficient agitation and mixing. Thereafter, aqueous ammonia was added to the mixture for neutralization and hydrolysis of the titanium sulfate, thereby permitting co-precipitation.

The co-precipitate was filtered, washed with water and again dispersed in water, to which 80 g of barium chloride dihydrate was added to solate the orthotitanic acid, followed by sufficient agitation and mixing. Subsequently, similar to Example 1, the precipitate was filtered, washed with water, dried at 100° C. for 12 hours and sintered at a temperature of 500° C. for 3 hours. The sintered product was milled in a sample mill, to which water was added for kneading, followed by extrusion molding in the form of a lattice by means of an extruder. The molding was heated for drying from normal temperatures to 100° C. and sintered at 500° C. for 3 hours to obtain a carrier used for removal of nitrogen oxides.

EXAMPLE 3

One kilogram, as titanium oxide, of a titanium sulfate solution was taken out from a manufacture process of titanium oxide by a sulfate method, to which 200 g of finely divided silicic acid (Fine Seal from Tokuyama Soda Co., Ltd.), followed by sufficient agitation and mixing. Thereafter, aqueous ammonia was added to the mixture for neutralization and hydrolysis the titanium sulfate, thereby permitting co-precipitation with finely divided silicic acid.

The precipitate was filtered, washed with water, dried at 100° C. for 12 hours, and sintered at a temperature of 500° C. for 3 hours. The sintered product was milled in a sample mill and the particle size was suitably adjusted for use as a carrier of a catalyst for removing nitrogen oxides. 250 ml of a 10% methylamine solution containing 110 g of ammonium paratungstate was added to one kilogram of the powder carrier and kneaded, followed by extrusion molding in the form of a lattice by means of an extruder and heating for drying from normal temperatures to 100° C. The dried lattice was sintered at 500° C. for 3 hours to obtain a catalyst having tungsten oxide.

EXAMPLE 4

The procedure of Example 3 was repeated except that Aerosil (Nippon Aerosil Co., Ltd.) was used as the finely divided silicic acid, thereby obtaining a carrier. Tungsten oxide was supported on the carrier in the same manner as in Example 3 to obtain a catalyst for nitrogen oxides.

EXAMPLE 5

The co-precipitate of orthotitanic acid and the silicic acid was filtered, washed with water and again dispersed in water. 80 g of barium chloride dihydrate was added to the dispersion to solate the orthotitanic acid, followed by sufficient agitation and mixing. Thereafter, the precipitate was, similar to Example 3, filtered, washed with water, dried at 100° C. for 12 hours and sintered at a temperature of 500° C. for 3 hours, followed by milling in a sample mill to obtain a carrier. The X-ray spectrum of the carrier is shown in FIG. 1. From the figure, it will be seen that the peak is so low and broad that the anatase crystals remain ungrown.

The X-ray spectrum was measured using an X-ray diffraction analyzer, RAD-IIA, by Rigaku Denki Co., Ltd. The measuring conditions were as follows.

Figure 5:
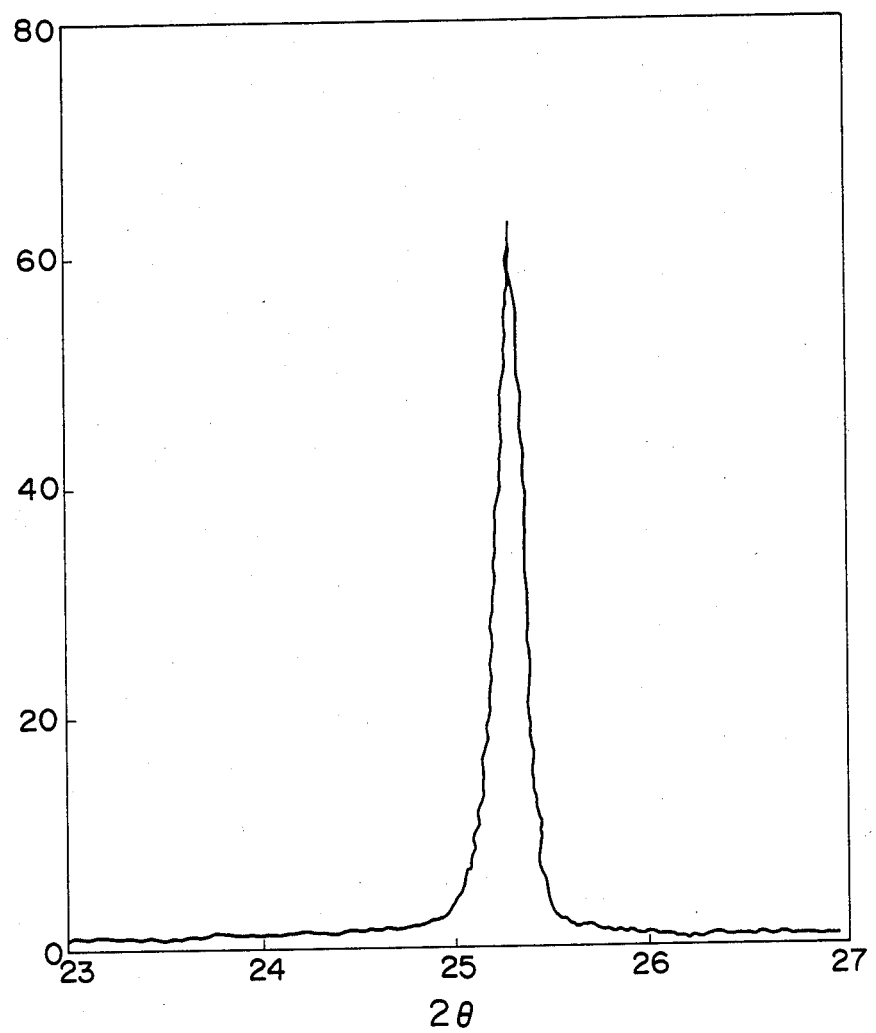
FIG. 5 is an X-ray spectrum of a titanium oxide pigment for comparison.

Scanning speed: 1°/4 minutes
Full scale: 1000 cps.
Time constant: 1 second
Chart speed: 10 mm/minute
Target: copper
Tube voltage: 30 KV
Tube current: 10 mA For comparison, the X-ray spectrum of a commercially sold anatase-type titanium oxide pigment is shown in FIG. 5. The same measuring conditions were used except that the full scale was 4000 cps.

The carrier of this example was supported with tungsten oxide in the same manner as in Example 3 to obtain a catalyst for removal of nitrogen oxides.

EXAMPLE 6

An aqueous solution of 10 g of ammonium metavanadate and 25 g of oxalic acid in water was impregnated in 1 kg of the tungsten oxide-bearing catalyst obtained in Example 3. Thereafter, the catalyst was dried at 100° C. for 12 hours and sintered at 500° C. for 3 hours to obtain a catalyst having tungsten oxide and vanadium oxide thereon.

EXAMPLE 7

Vanadium oxide was supported on the tungsten oxide-bearing catalyst obtained in Example 4 in the same manner as in Example 6, thereby obtaining a catalyst for nitrogen oxides.

EXAMPLE 8

Vanadium oxide was supported on the tungsten oxide-bearing catalyst obtained in Example 5 in the same manner as in Example 6, thereby obtaining a catalyst for removal of nitrogen oxides.

EXAMPLE 9

300 ml of a methylamine solution dissolving 120 g of ammonium molybdenate was impregnated in 1 kg of the tungsten oxide-bearing catalyst obtained in Example 3, followed by drying at 100° C. for 12 hours and sintering at 500° C. for 3 hours to obtain a catalyst having tungsten oxide and molybdenum oxide thereon.

EXAMPLE 10

300 ml of a methylamine solution dissolving 120 g of ammonium molybdenate was impregnated in 1 kg of the tungsten oxide-bearing catalyst obtained in Example 4, followed by drying and sintering under the same conditions as in Example 3 to obtain a catalyst having tungsten oxide and molybdenum oxide thereon.

EXAMPLE 11

300 ml of a methylamine solution dissolving 120 g of ammonium molybdenate was impregnated in 1 kg of the tungsten oxide-bearing catalyst obtained in Example 5, followed by drying and sintering under the same conditions as in Example 3 to obtain a catalyst having tungsten oxide and molybdenum oxide thereon.

COMPARATIVE EXAMPLE 1

The general procedure of Example 1 was repeated except that finely divided silicic acid was not used, thereby obtaining a catalyst having tungsten oxide thereon.

COMPARATIVE EXAMPLE 2

In the same manner as in Example 3 without use of finely divided silicic acid, titanium sulfate was neutralized and hydrolyzed to give orthotitanic acid, which was subsequently filtered, washed with water, dispersed again in water and solated with barium chloride. Thereafter, the resulting sol was filtered, dried at 100° C. for 12 hours and sintered at a temperature of 500° C. for 3 hours. The sintered product was milled in a sample mill and the particle size was suitably adjusted to obtain a powder carrier. The carrier was supported with tungsten oxide in the same manner as in Example 3 to obtain a catalyst for nitrogen oxides.

COMPARATIVE EXAMPLE 3

An aqueous solution of 10 g of ammonium metavanadate and 25 g of oxalic acid in water was impregnated in 1 kg of the tungsten oxide-bearing catalyst obtained in Comparative Example 1, followed by drying at 100° C. for 12 hours and sintering at 500° C. for 3 hours, thereby obtaining a catalyst having tungsten oxide and vanadium oxide thereon.

COMPARATIVE EXAMPLE 4

Vanadium oxide was deposited on the tungsten oxide-bearing catalyst obtained in Comparative Example 2 in the same manner as in Comparative Example 3, thereby obtaining a same manner as in Comparative Example 3, thereby obtaining a catalyst for removal of nitrogen oxides.

COMPARATIVE EXAMPLE 5

The general procedure of Example 9 was repeated using 1 kg of the tungsten oxide-bearing catalyst obtained in Comparative Example 1, thereby obtaining a catalyst having tungsten oxide and molybdenum oxide thereon.

COMPARATIVE EXAMPLE 6

The general procedure of Example 9 was repeated using 1 kg of the tungsten oxide-bearing catalyst obtained in Comparative Example 2, thereby obtaining a catalyst having tungsten oxide and molybdenum oxide thereon.

The catalysts for removal of nitrogen oxides obtained in the foregoing examples and comparative examples were each subjected to catalytic contact with a mixed gas of a composition comprising 200 ppm of nitrogen oxides, 200 ppm of ammonia, 10% of steam, 12% of carbon dioxide, 800 ppm of sulfur dioxide and the balance of nitrogen at a temperature of 380° C. a space velocity of 5000 hr$^{-1}$. The rate of removal of nitrogen oxides (NOx) and the rate of oxidation of sulfur dioxide (SO$_2$) were measured. The results are shown in Table 1. The rate (%) of removal of nitrogen oxides and the rate (%) of oxidation of sulfur dioxide were calculated according to the following equations.

TABLE 1

Rate of removal of nitrogen oxide (%) = (concentration of NOx at the inlet of the catalyst bed − concentration of NOx at the outlet of the catalyst bed)/(concentration of NOx at the inlet of the catalyst bed) × 100

Rate of oxidation of sulfur dioxide (%) = (concentration of SO$_2$ at the inlet of the catalyst bed − concentration of SO$_2$ at the outlet of the catalyst bed)/(concentrations of SO$_2$ + SO$_3$ at the inlet of the catalyst bed) × 100

|  | Rate of Removal of NOx (%) | Rate of Oxidation of SO$_2$ (%) |
|---|---|---|
| Example |  |  |
| 1 | 10 | 0.0 |
| 2 | 7 | 0.0 |
| 3 | 89 | 0.1 |
| 4 | 89 | 0.1 |
| 5 | 90 | 0.1 |
| 6 | 95 | 0.3 |
| 7 | 95 | 0.2 |
| 8 | 96 | 0.3 |
| 9 | 93 | 0.2 |
| 10 | 93 | 0.2 |
| 11 | 95 | 0.3 |
| Comp. Ex. |  |  |
| 1 | 85 | 0.2 |
| 2 | 84 | 0.2 |
| 3 | 91 | 1.2 |
| 4 | 90 | 1.0 |
| 5 | 89 | 0.3 |
| 6 | 89 | 0.3 |

EXAMPLE 12

A titanium sulfate solution obtained from a manufacture process of titanium oxide by a sulfate method was neutralized and hydrolyzed with aqueous ammonia to obtain orthotitanic acid. One kilogram, as titanium oxide, of the orthotitanic acid was taken out, to which 80 g of barium chloride dihydrate was added for solation, followed by sufficient agitation and mixing. Thereafter, 250 ml of a 10% methylamine solution containing 110 g of ammonium paratungstate was added to the mixture and sufficiently agitated and mixed, followed by drying at 100° C. for 12 hours and sintering at a temperature of 500° C. for 3 hours. The resulting sintered product was milled in a sample mill and the size was appropriately adjusted, after which a suitable amount of water was added and kneaded. Subsequently, the mixture was subjected to extrusion molding in the form of a lattice by means of an extruder, dried by heating from normal temperatures to 100° C. and sintered at 500° C. for 3 hours to obtain a sintered article. This article is useful as a catalyst for removal of nitrogen oxides.

Figure 2:
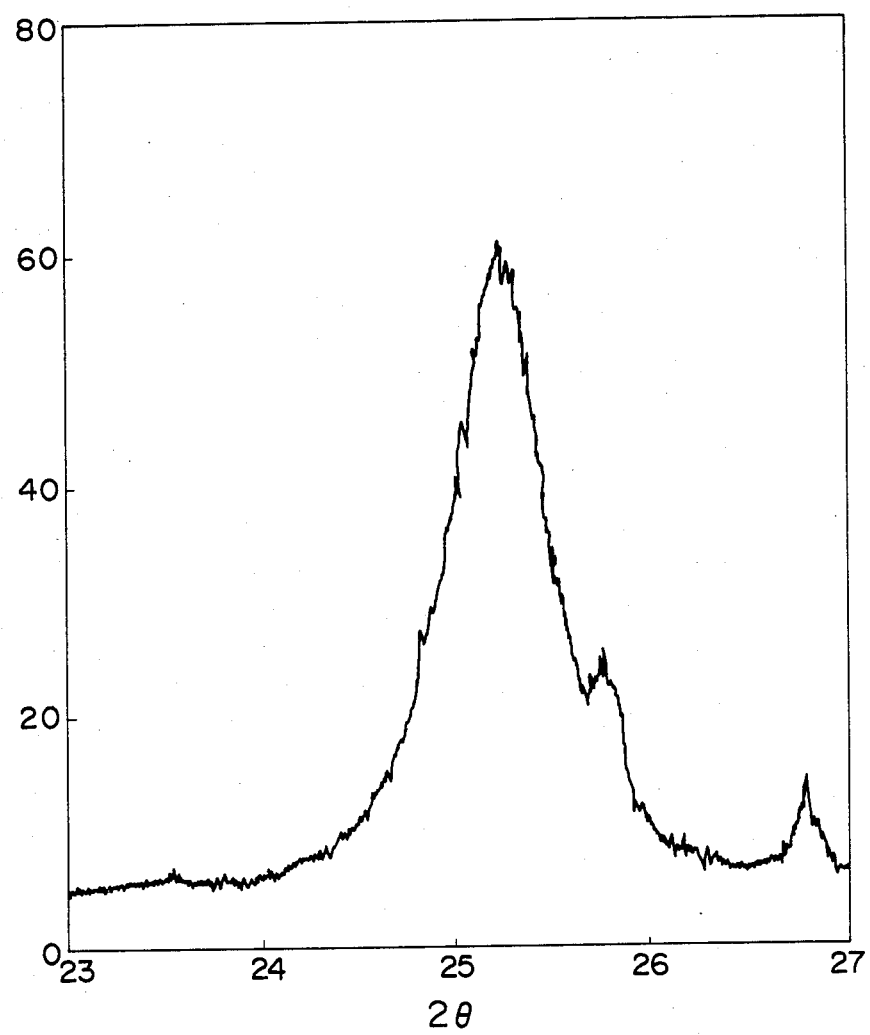
FIGS. 2 through 4 are, respectively, X-ray spectra of titanium oxide sintered products obtained in Examples 12, 19 and 25.

The X-ray spectrum of the sintered article is shown in FIG. 2, revealing that the peak is so low and broad that anatase crystals remain ungrown.

The X-ray spectrum was measured using the X-ray diffraction analyzer, RAD-IIA, indicated before with the same measuring conditions as in Example 5.

EXAMPLE 13

One kilogram, calculated as titanium oxide, of orthotitanic acid as in Example 12 was taken out, to which 80 g of barium chloride dihydrate was added for solation, followed by sufficient agitation and mixing. Thereafter, 300 ml of a methylamine solution containing 120 g of ammonium molybdenate, followed by repeating the procedure of Example 12 to obtain a sintered product. The product was subjected to extrusion molding in the same manner as in Example 12 to obtain a sintered article usable as a catalyst for removal of nitrogen oxides.

EXAMPLE 14

An aqueous solution containing 10 g of ammonium metavanadate and 25 g of oxalic acid was added to 1 kg of the sintered product obtained in Example 12, followed by sufficient kneading and extrusion molding in the form of a lattice by means of an extruder. The lattice molding was dried by heating from normal temperatures to 100° C. and sintered at 500° C. for 3 hours, thereby obtaining a catalyst for removal of nitrogen oxides.

EXAMPLE 15

The general procedure of Example 14 was repeated except that the sintered product of Example 13 was used, thereby obtaining a catalyst for removal of nitrogen oxides.

EXAMPLE 16

Five percent by weight of manganese oxide was deposited on 1 kg of the sintered powder product obtained in Example 12, after which the procedure of Example 12 was repeated to obtain a sintered lattice article for use as a catalyst for removal of nitrogen oxides.

EXAMPLE 17

After deposition of 5 wt % of manganese oxide on 1 kg of the sintered powder product obtained in Example 13, a catalyst for removal of nitrogen oxides was obtained in the same manner as in Example 13.

EXAMPLE 18

After deposition of 5 wt % of manganese oxide on 1 kg of the sintered powder product obtained in Example 14, a catalyst for removal of nitrogen oxides was obtained in the same manner as in Example 14.

COMPARATIVE EXAMPLE 7

One kilogram, calculated as titanium oxide, of orthotitanic acid as used in Example 12 was taken out, to which 80 g of barium chloride dihydrate was added for solation, followed by sufficient agitation and mixing, drying at 100° C. for 12 hours and sintering at 500° C. for 3 hours. The sintered product was milled in a sample mill and the particle size was suitably adjusted. Thereafter, 250 ml of a methylamine solution containing 110 g of ammonium paratungstate was added and kneaded, to which water was further added in suitable amounts and kneaded, followed by extrusion molding in the form of a lattice in the same manner as in Example 12 and sintering to obtain a catalyst for removal of nitrogen oxides.

COMPARATIVE EXAMPLE 8

An aqueous solution of 10 g of ammonium orthovanadate and 25 g of oxalic acid dissolved in water was added to 1 kg of the sintered product obtained in Comparative Example 7, to which a suitable amount of water was further added and kneaded. The mixture was subjected to extrusion molding in the form of a lattice, dried at 100° C. for 12 hours and sintered at 500° C. for 3 hours to obtain a catalyst for removal of nitrogen oxides.

COMPARATIVE EXAMPLE 9

The general procedure of Example 12 was repeated except that orthotitanic acid was not solated with barium chloride, thereby obtaining a sintered article.

COMPARATIVE EXAMPLE 10

In Comparative Example 7, a manganese nitrate solution whose concentration was adjusted to 5 wt % as manganese oxide was added, instead of ammonium paratungstate, and kneaded, to which a suitable amount of water was added for further kneading. Thereafter, the mixture was subjected to extrusion molding in the form of a lattice and sintered in the same manner as in Example 12 to obtain a catalyst for removal of nitrogen oxides.

COMPARATIVE EXAMPLE 11

An aqueous solution of 10 g of ammonium metavanadate and 25 g of oxalic acid in water was added to 1 kg of the sintered product obtained in Comparative Example 10, to which a suitable amount of water was further added and kneaded. The mixture was subjected to extrusion molding in the form of a lattice, dried at 100° C. for 12 hours and sintered at 500° C. for 3 hours to obtain a catalyst for removal of nitrogen oxides.

COMPARATIVE EXAMPLE 12

The general procedure of Example 13 was repeated except that orthotitanic acid was not solated with barium chloride to obtain a sintered article.

The catalysts obtained in the above examples and comparative examples were each tested by contact with a mixed gas comprising 200 ppm of nitrogen oxides, 200 ppm of ammonia, 10% of steam, 12% of carbon dioxide, 800 ppm of sulfur dioxide and the balance of nitrogen at a temperature of 380° C. at a space velocity of 5000 $hr^{-1}$ to measure a rate of removal of nitrogen oxides (NOx) and a rate of oxidation of sulfur dioxide ($SO_2$). The results are shown in Table 2.

TABLE 2

| Example | Rate of Removal of NOx (%) | Rate of Oxidation of $SO_2$ (%) |
|---|---|---|
| 12 | 89 | 0.1 |
| 13 | 88 | 0.1 |
| 14 | 95 | 0.6 |
| 15 | 95 | 0.6 |
| 16 | 90 | 0.1 |
| 17 | 90 | 0.1 |
| 18 | 96 | 0.6 |
| Comp. Ex. | | |

TABLE 2-continued

| | Rate of Removal of NOx (%) | Rate of Oxidation of SO$_2$ (%) |
|---|---|---|
| 7 | 84 | 0.2 |
| 8 | 92 | 1.0 |
| 9 | 83 | 0.3 |
| 10 | 83 | 0.2 |
| 11 | 92 | 0.9 |
| 12 | 82 | 0.3 |

EXAMPLE 19

A titanium sulfate solution obtained from a manufacture process of titanium oxide by a sulfate method was neutralized and hydrolyzed with aqueous ammonia to obtain orthotitanic acid. One kilogram, as titanium oxide, of th orthotitanic acid was taken out, to which 80 g of barium chloride dihydrate was added for solation, followed by sufficient agitation and mixing. Thereafter, 250 ml of a 10% methylamine solution containing 200 g of finely divided silicic acid (Fine Seal, by Tokuyama Soda Co., Ltd.) and 110 g of ammonium paratungstate was added to the mixture and sufficiently agitated and mixed, followed by drying at 100° C. for 12 hours and sintering at a temperature of 500° C. for 3 hours. The resulting sintered product was milled in a sample mill and the size was suitably adjusted, after which a suitable amount of water was added and kneaded. Subsequently, the mixture was subjected to extrusion molding in the form of a lattice by means of an extruder, dried by heating from normal temperatures to 100° C. and sintered at 500° C. for 3 hours to obtain a sintered article. This article was used, as it is, as a catalyst for removal of nitrogen oxides.

Figure 3:
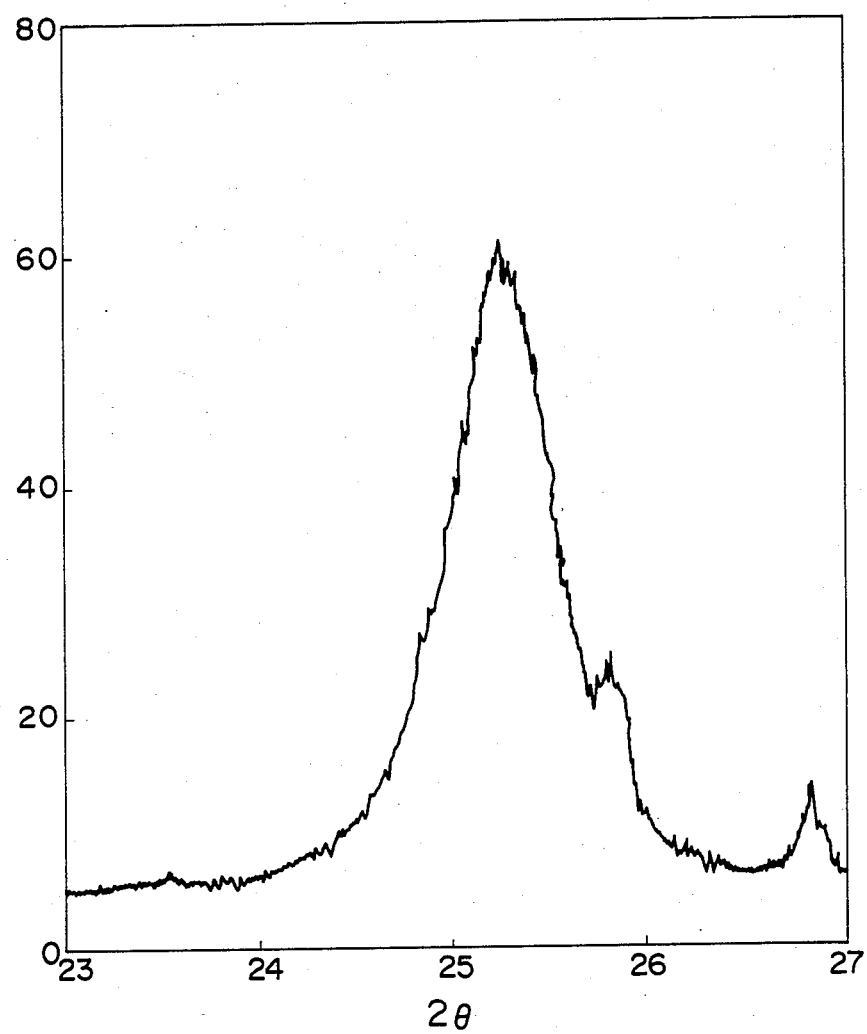

The X-ray spectrum of the sintered article is shown in FIG. 3, revealing that the peak is so low and broad that anatase crystals remain ungrown.

The X-ray spectrum was measured using the X-ray diffraction analyzer, RAD-IIA, indicated before with the same measuring conditions as in Example 5.

EXAMPLE 20

The general procedure of Example 19 was repeated except that 300 ml of a methylamine solution containing 120 g of ammonium molybdenate instead of ammonium paratungstate was used, thereby obtaining a sintered article. This article was used as it is as a catalyst for removal of nitrogen oxides.

EXAMPLE 21

250 ml of a methylamine solution containing 110 g of ammonium paratungstate and 10 g of ammonium metavanadate was added to 1 kg of the sintered powder product obtained in Example 19 and kneaded, followed by extrusion molding in the form of a lattice by means of an extruder. The lattice molding was dried by heating from normal temperatures to 100° C. and sintered at 500° C. for 3 hours to obtain a catalyst having tungsten oxide and vanadium oxide thereon.

EXAMPLE 22

The sintered powder product obtained in Example 20 was treated in the same manner as in Example 21 to obtain a catalyst having tungsten oxide and vanadium oxide thereon.

EXAMPLE 23

The general procedure of Example 19 was repeated except that 5 wt % of manganese oxide was deposited on 1 kg of the sintered powder product obtained in Example 19 thereby obtaining a sintered article of a lattice molding. This article was used as a catalyst for removal of nitrogen oxides.

EXAMPLE 24

The general procedure of Example 20 was repeated except that 5 wt % of manganese oxide was deposited on 1 kg of the sintered powder product obtained in Example 20, thereby obtaining a sintered article of a lattice molding. This article was used, as it is, as a catalyst for removal of nitrogen oxides.

COMPARATIVE EXAMPLE 13

The general procedure of Example 19 was repeated except that orthotitanic acid was not solated with barium chloride dihydrate, thereby obtaining a sintered article. The article was used, as it is, as a catalyst for removal of nitrogen oxides.

COMPARATIVE EXAMPLE 14

The general procedure of Example 19 was repeated except that orthotitanic acid was not solated with barium chloride and that 300 ml of a methylamine solution containing 120 g of ammonium molybdenate instead of ammonium paratungstate was used, thereby obtaining a sintered article. This article was used, as it is, as a catalyst for removal of nitrogen oxides.

COMPARATIVE EXAMPLE 15

An aqueous solution containing 10 g of ammonium metavanadate and 25 g of oxalic acid was added to 1 kg of the sintered product obtained in Comparative Example 13, followed by sufficient kneading, extrusion molding, drying at 100° C. for 2 hours, and sintering at 500° C. for 3 hours, thereby obtaining a catalyst for removal of nitrogen oxides.

COMPARATIVE EXAMPLE 16

An aqueous solution containing 10 g of ammonium metavanadate and 25 g of oxalic acid was added to 1 kg of the sintered product obtained in Comparative Example 14, followed by sufficient kneading, extrusion molding, drying at 100° C. for 2 hours, and sintering at 500° C. for 3 hours, thereby obtaining a catalyst for removal of nitrogen oxides.

COMPARATIVE EXAMPLE 17

One kilogram, as titanium oxide, of orthotitanic acid as in Example 19 was taken out, to which 80 g of barium chloride dihydrate for solation, followed by sufficient agitation and mixing. The mixture was dried at 100° C. for 12 hours and sintered at 500° C. for 3 hours. The sintered product was milled and the size was adjusted. 250 ml of a 10% methylamine solution containing 200 g of finely divided silicic acid (Fine Seal, Tokuyama Soda Co., Ltd.) and 110 g of ammonium paratungstate was added to the mixture, followed by sufficient agitation and mixing. A suitable amount of water was added to the mixture, which was kneaded and subjected to extrusion molding in the form of a lattice by means of an extruder and dried by heating from normal temperatures to 100° C. and sintered at 500° C. for 3 hours, thereby obtaining a catalyst for removal of nitrogen oxides.

COMPARATIVE EXAMPLE 18

The general procedure of Comparative Example 15 was repeated using the titanium oxide sintered product obtained in Comparative Example 17, thereby obtaining a catalyst for removal of nitrogen oxides.

COMPARATIVE EXAMPLE 19

The general procedure of Comparative Example 15 was repeated without deposition of 5 wt % of manganese oxide on the sintered product obtained in Comparative Example 13, thereby obtaining a catalyst for removal of nitrogen oxides.

Comparative Example 20

The general procedure of Comparative Example 15 was repeated without deposition of 5 wt % of manganese oxide on the sintered product obtained in Comparative Example 14, thereby obtaining a catalyst for removal of nitrogen oxides.

The catalysts obtained in the above examples and comparative examples were each tested by contact with a mixed gas comprising 200 ppm of nitrogen oxides, 200 ppm of ammonia, 10% of steam, 12% of carbon dioxide, 800 ppm of sulfur dioxide and the balance of nitrogen at a temperature of 380° C., a space velocity of 5000 hr$^{-1}$ to measure a rate of removal of nitrogen oxides (NOx) and a rate of oxidation of sulfur dioxide (SO$_2$). The results are shown in Table 3.

TABLE 3

| | Rate of Removal of NOx (%) | Rate of Oxidation of SO$_2$ (%) |
|---|---|---|
| Example | | |
| 19 | 89 | 0.1 |
| 20 | 89 | 0.1 |
| 21 | 95 | 0.1 |
| 22 | 96 | 0.1 |
| 23 | 92 | 0.1 |
| 24 | 92 | 0.1 |
| Comp. Ex. | | |
| 13 | 84 | 0.2 |
| 14 | 83 | 0.2 |
| 15 | 92 | 1.2 |
| 16 | 91 | 1.0 |
| 17 | 83 | 0.3 |
| 18 | 92 | 1.0 |
| 19 | 87 | 0.2 |
| 20 | 86 | 0.2 |

EXAMPLE 25

A titanium sulfate solution obtained from a manufacture process of titanium oxide by a sulfate method was neutralized and hydrolyzed with aqueous ammonia to obtain orthotitanic acid. One kilogram, as titanium oxide, of the orthotitanic acid was taken out, washed with water, dried at 100° C. for 12 hours and sintered at 500° C. for 3 hours. The sintered product was milled in a sample mill, to which a 10% methylamine solution containing 110 g of ammonium paratungstate was added and kneaded. Thereafter, the mixture was subjected to extrusion molding in the form of a lattice, dried by heating from normal temperatures to 100° C. and sintered at 500° C. for 3 hours, thereby obtaining a sintered article. This was useful as a catalyst for removal of nitrogen oxides as will be described hereinafter.

Figure 4:
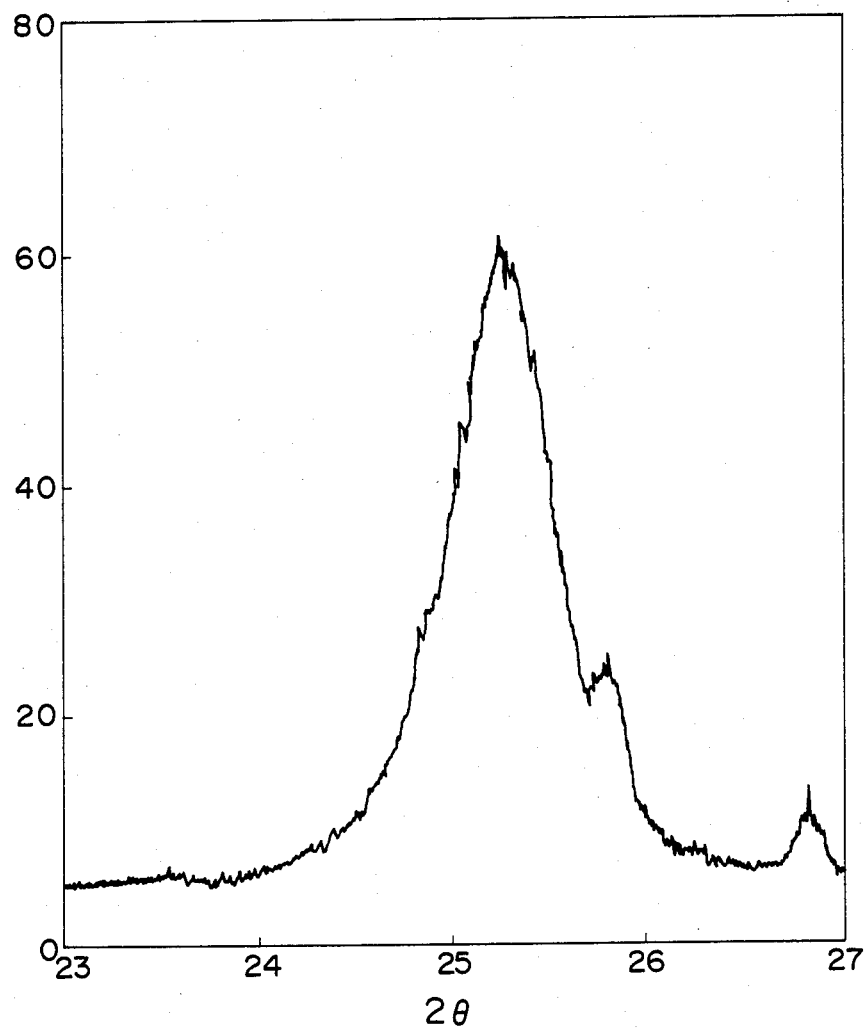

The X-ray spectrum of the sintered article is shown in FIG. 4, revealing that the peak is so low and wide that anatase crystals remain ungrown.

The X-ray spectrum was measured using the X-ray diffraction analyzer, RAD-IIA, indicated before with the same measuring conditions as in Example 5.

EXAMPLE 26

300 ml of a methylamine solution containing 120 g of ammonium molybdenate (corresponding to 98 g of MoO$_3$) was added to the sintered product of the mixture of titanium oxide and ammonium paratungstate obtained in Example 25, followed by sintering in the same manner as in the second sintering in Example 25 to obtain a sintered product. This product in the form of a powder was subjected to extrusion molding and sintered to obtain a sintered article usable as a catalyst for removal of nitrogen oxides.

EXAMPLE 27

An aqueous solution containing 10 g of ammonium metavanadate and 25 g of oxalic acid was added to 1 kg of the sintered product of the mixture of titanium oxide and ammonium paratungstate obtained in Example 25 and sufficiently kneaded. Thereafter, the mixture was subjected to extrusion molding in the form of a lattice by means of an extruder, followed by drying by heating from normal temperatures to 100° C., sintering at 500° C. for 3 hours, and further extrusion molding, thereby obtaining a catalyst for removal of nitrogen oxides.

COMPARATIVE EXAMPLE 21

A titanium sulfate solution obtained from a manufacture process of titanium oxide by a sulfate method was thermally hydrolyzed to obtain metatitanic acid. One kilogram, as titanium oxide, of the metatitanic acid was taken out to which 80 g of barium chloride dihydrate as a solating agent was added for solation, followed by sufficient agitation and mixing, drying at 100° C. for 12 hours and sintering at a temperature of 500° C. for 3 hours. One kilogram of the sintered product was milled in a sample mill with the size being adjusted, after which a 10% methylamine solution containing 110 g of ammonium paratungstate was added and kneaded. The mixture was subjected to extrusion molding in the form of a lattice by means of an extruder, dried by heating from normal temperatures to 100° C. and sintered at 500° C. for 3 hours, thereby obtaining a sintered article. This article is usable as a catalyst for removal of nitrogen oxides.

COMPARATIVE EXAMPLE 22

The sintered product of the mixture of barium-containing titanium oxide and ammonium paratungstate obtained in Comparative Example 21 was mixed with 300 ml of a methylamine solution containing 120 g of ammonium molybdenate, followed by repeating the procedure of Comparative Example 21 to obtain a sintered product in the form of a powder. The powder was further subjected to extrusion molding and sintered to obtain a sintered article usable as a catalyst for removal of nitrogen oxides.

COMPARATIVE EXAMPLE 23

An aqueous solution containing ammonium metavanadate and 25 g of oxalic acid was added to the sintered product of the mixture of barium-containing titanium oxide and ammonium paratungstate obtained in Comparative Example 21, and sufficiently kneaded. Thereafter, the mixture was subjected to extrusion molding in the form of a lattice by means of an extruder, dried by heating from normal temperatures to 100° C., and sintered at 500° C. for 3 hours, followed by further extrusion molding to obtain a catalyst for removal of nitrogen oxides.

EXAMPLE 28

A titanium sulfate solution obtained from a manufacture process of titanium oxide by a sulfate method was neutralized and hydrolyzed with aqueous ammonia to obtain orthotitanic acid. One kilogram, as titanium oxide, of the orthotitanic acid was taken out, washed with water, dried at 100° C. for 12 hours and sintered at 500° C. for 3 hours. The sintered product was milled in a sample mill with the size being suitably adjusted, after which 300 ml of a methylamine solution containing 120 g of ammonium molybdenate was added and kneaded. The mixture was subjected to extrusion molding in the form of a lattice by means of an extruder, dried by heating from normal temperatures to 100° C. and sintered at 500° C. for 3 hours to obtain a sintered article. The article was subjected to measurement of an X-ray spectrum under the same conditions as in Example 25, from which it was confirmed that anatase crystals remained ungrown.

EXAMPLE 29

A titanium sulfate solution obtained from a manufacture process of titanium oxide by a sulfate method was neutralized and hydrolyzed with aqueous ammonia to obtain orthotitanic acid. One kilogram, as titanium oxide, of the orthotitanic acid was taken out, washed with water, dried at 100° C. for 12 hours and sintered at 500° C. for 3 hours. The sintered product was milled in a sample mill with the size being suitably adjusted, after which a 10% methylamine solution containing 110 g of ammonium paratungstate and 120 g of ammonium molybdenate was added and kneaded. Thereafter, the procedure of Example 25 was repeated to prepare a catalyst of a sintered article.

The sintered article was subjected to measurement of an X-ray spectrum under the same conditions as in Example 25, from which it was confirmed that the anatase crystals were left as ungrown.

EXAMPLE 30

An aqueous solution containing 10 g of ammonium metavanadate and 25 g of oxalic acid was added to 1 kg of the sintered product of the mixture of titanium oxide and ammonium molybdenate obtained in Example 28 and sufficiently kneaded. The mixture was subjected to extrusion molding in the form of a lattice by means of an extruder, dried by heating from normal temperatures to 100° C., sintered at 500° C. for 3 hours and further subjected to extrusion molding to obtain a catalyst for removal of nitrogen oxides.

EXAMPLE 31

A 10% methylamine solution containing 110 g of ammonium paratungstate was added to 1 kg of the sintered product of the mixture of titanium oxide and ammonium molybdenate obtained in Example 28 and sufficiently kneaded. The mixture was subjected to extrusion molding in the form of a lattice by means of an extruder, dried by heating from normal temperatures to 100° C., and sintered at 500° C. for 3 hours to obtain a sintered article according to the invention.

EXAMPLE 32

An aqueous solution containing 10 g of ammonium metavanadate and 25 g of oxalic acid was added to 1 kg of the sintered product of the mixture of titanium oxide and ammonium paratungstate obtained in Example 29 and sufficiently kneaded. The mixture was subjected to extrusion molding in the form of a lattice by means of an extruder, dried by heating from normal temperatures to 100° C., sintered at 500° C. for 3 hours and further subjected to extrusion molding to obtain a catalyst for removal of nitrogen oxides.

EXAMPLE 33

An aqueous solution of manganese nitrate having such a controlled concentration as to permit 5 wt % as manganese oxide was added to 1 kg of the sintered product of the mixture of titanium oxide and ammonium paratungstate obtained in Example 25, and sufficiently kneaded. The mixture was subjected to extrusion molding in the form of a lattice by means of an extruder, followed drying by heating from normal temperatures to 100° C., sintering at 500° C. for 3 hours and further extrusion molding to obtain a catalyst for removal of nitrogen oxides.

The catalysts obtained in the above examples and comparative examples were each tested by contact with a mixed gas comprising 100 ppm of nitrogen oxides, 100 ppm of ammonia, 10% of steam, 12% of carbon dioxide, 800 ppm of sulfur dioxide and the balance of nitrogen at a temperature of 360° C., a space velocity of 5000 hr$^{-1}$ to measure a rate of removal of nitrogen oxides (NOx) and a rate of oxidation of sulfur dioxide (SO$_2$). The results are shown in Table 4.

TABLE 4

| | Rate of Removal of NOx (%) | Rate of Oxidation of SO$_2$ (%) |
|---|---|---|
| Example | | |
| 25 | 84.5 | 0.2 |
| 26 | 84.0 | 0.2 |
| 27 | 91.5 | 0.8 |
| 28 | 85.0 | 0.2 |
| 29 | 84.5 | 0.3 |
| 30 | 92.0 | 0.8 |
| 31 | 86.0 | 0.4 |
| 32 | 93.5 | 1.1 |
| 33 | 92.0 | 0.9 |
| Comp. Ex. | | |
| 21 | 80.5 | 0.4 |
| 22 | 80.0 | 0.4 |
| 23 | 89.5 | 1.5 |

As will be apparent from the above results, the catalysts obtained by the method of the invention have a high removal rate of nitrogen oxides with a low rate of oxidation of sulfur dioxide. Thus, the disadvantage based on the formation of sulfur trioxide during the removal of nitrogen oxides from mixed gases can be overcome.

What is claimed is:

1. A process for preparing a catalyst for the removal of nitrogen oxides which comprises sintering orthotitanic acid in with at least one compound selected from the group consisting of finely divided silicic acid, tungsten compounds and molybdenum compound to produce sintered titanium oxide in the form of anatase.

2. A process for preparing a catalyst for removal of nitrogen oxides which comprises sintering orthotitanic acid in with at least one compound selected from the group consisting of finely divided silicic acid, tungsten compounds and molybdenum compounds to produce a sintered anatase-type titanium oxide product and further depositing a catalytic component for removing nitrogen oxdides on the sintered product.

3. A process according to claim 1, comprising adding the finely divided silicic acid to titanium sulfate and neutralizing and hydrolyzing the mixture, drying and thereafter sintering.

4. A process according to claim 3, wherein after the neutralization and hydrolysis, the mixture is solated.

5. A process according to claim 2, comprising adding the finely divided silicic acid to titanium sulfate and neutralizing and hydrolyzing the mixture, drying and thereafter sintering, further depositing a catalytic component for removing nitrogen oxides on the sintered product.

6. A process according to claim 5, wherein after the neutralization and hydrolysis, the mixture is solated.

7. A process according to claim 1, comprising sintering solated orthotitanic acid containing at least one compound selected from the group consisting of finely divided silicic acid, tungsten compounds and molybdenum compounds.

8. A process according to claim 2, comprising sintering solated orthotitanic acid containing at least one compound selected from the group consisting of finely divided silicic acid, tungsten compounds and molybdenum compounds, thereafter depositing a catalytic component for removing nitrogen oxides on the sintered product.

9. A process according to claim 1, comprising sintering solated orthotitanic acid containing at least one compound selected from the group consisting of tungsten compounds and molybdenum compounds.

10. A process according to claim 2, comprising sintering solated orthotitanic acid containing at least one compound selected from the group consisting of tungsten compounds and molybdenum compounds, thereafter depositing a catalytic component for removing nitrogen oxides on the sintered product.

11. A process according to claim 1, comprising that sintering after neutralizing and hydrolyzing titanium sulfate, and thereafter the resulting sintered product is further mixed with a tungsten compound and/or molybdenum compound, dried and sintered.

12. A process according to claim 2, comprising mixing titanium oxide product with a tungsten and/or molybdenum compound, drying, and sintering the resulting mixture and depositing a nitrogen-removing catalyst thereon, said titanium oxide having been obtained by neutralizing, hydrolyzing and sintering titanium sulfate.

13. The process of claim 1, wherein the silicic acid has an average particle size of from 10 to 50 millimicrometers.

14. The process of claim 1, wherein said silicic acid has a specific surface area of from 200 to 300 $m^2/g$.

15. A process for preparing a carrier for a nitrogen-removing oxides-removing catalyst containing titanium oxide in the form of anatase-type crystals, comprising: adding fine particles of silicic acid to titanium sulfate, neutralizing the resulting mixture and hydrolyzing said mixture to form orthotitanic acid, drying said mixture and sintering said dried mixture to form a sintered carrier product.

16. The process of claim 15, further including the step of depositing on said product an oxide of at least one element of the group of vanadium, tungsten, molybdenum, copper, chromium, manganese and cerium.

* * * * *